United States Patent
Lindberg et al.

(10) Patent No.: US 10,865,577 B2
(45) Date of Patent: Dec. 15, 2020

(54) FLEXIBLE FASTENING UNIT FOR A BEAM

(71) Applicant: Mon.Zon Development AB, Gothenburg (SE)

(72) Inventors: Johan Lindberg, Örby (SE); Lars Carlbom, Gråbo (SE)

(73) Assignee: Mon.Zon Development AB, Gothenburg (SE)

( * ) Notice: Subject to any disclaimer, the term of this patent is extended or adjusted under 35 U.S.C. 154(b) by 345 days.

(21) Appl. No.: 15/575,930

(22) PCT Filed: May 20, 2016

(86) PCT No.: PCT/EP2016/061417
§ 371 (c)(1),
(2) Date: Nov. 21, 2017

(87) PCT Pub. No.: WO2016/185014
PCT Pub. Date: Nov. 24, 2016

(65) Prior Publication Data
US 2018/0148942 A1 May 31, 2018

(30) Foreign Application Priority Data
May 21, 2015 (SE) ...................................... 1550648

(51) Int. Cl.
*E04G 7/32* (2006.01)
*E04G 7/34* (2006.01)
(Continued)

(52) U.S. Cl.
CPC .................. *E04G 7/32* (2013.01); *E04G 7/34* (2013.01); *F16B 2/14* (2013.01); *F16B 7/22* (2013.01); *Y10T 403/30* (2015.01)

(58) Field of Classification Search
CPC .. F16B 2/14; F16B 7/044; F16B 7/048; F16B 7/0486; F16B 7/22; E04G 5/165;
(Continued)

(56) References Cited

U.S. PATENT DOCUMENTS 4,493,578 A * 1/1985 D'Alessio ............... E04G 7/307
403/49
4,587,786 A  5/1986 Woods
(Continued)

FOREIGN PATENT DOCUMENTS

AU  2008207593 B2  4/2015
DE  698 01 103 T2  10/2011
(Continued)

OTHER PUBLICATIONS

International Search Report for corresponding International Application No. PCT/EP2016/061417 dated Jul. 22, 2016.
(Continued)

*Primary Examiner* — Josh Skroupa
(74) *Attorney, Agent, or Firm* — Renner, Otto, Boisselle & Sklar, LLP

(57) ABSTRACT

A fastening unit for attaching a first beam to a second beam is provided, wherein the second beam is arranged substantially perpendicularly to the first beam, the fastening unit having a first axis and a second axis, wherein the second axis is substantially perpendicular to the first axis. The fastening unit comprises a connecting member extending in a direction parallel to the first axis of the fastening unit and having a first edge portion, a second edge portion and a central portion, the connecting member further comprising a coupling element.

12 Claims, 7 Drawing Sheets

(51) Int. Cl.
*F16B 2/14* (2006.01)
*F16B 7/22* (2006.01)

(58) Field of Classification Search
CPC ........... E04G 7/12; E04G 7/305; E04G 7/307; E04G 7/308; E04G 7/32; E04G 7/34; Y10T 403/30; Y10T 403/4645; Y10T 403/4674; Y10T 403/76
USPC .............. 403/49, 246, 256, 409.1; 182/186.8
See application file for complete search history.

(56) References Cited

U.S. PATENT DOCUMENTS

| | | | | |
|---|---|---|---|---|
| 5,127,757 | A * | 7/1992 | Langer | E04G 7/307 |
| | | | | 403/49 |
| 5,411,113 | A * | 5/1995 | Lubinski | E04G 7/307 |
| | | | | 403/49 |
| 5,605,204 | A * | 2/1997 | Ausejo | E04G 7/307 |
| | | | | 403/49 |
| 5,868,223 | A * | 2/1999 | Lubinski | E04G 7/307 |
| | | | | 403/49 |
| 5,961,240 | A | 10/1999 | Bobrovniczky | |
| 8,978,823 | B2 * | 3/2015 | Kreller | E04G 7/307 |
| | | | | 403/49 |
| 8,979,413 | B2 * | 3/2015 | Brinkmann | E04G 7/307 |
| | | | | 403/49 |
| 10,400,460 | B2 * | 9/2019 | Hayman | E04G 7/307 |
| 2002/0141811 | A1 | 10/2002 | Shih | |
| 2006/0039746 | A1 * | 2/2006 | Stringer | E04G 7/307 |
| | | | | 403/49 |
| 2013/0177346 | A1 | 7/2013 | Brinkmann | |
| 2013/0330117 | A1 | 12/2013 | Kreller | |
| 2014/0030009 | A1 | 1/2014 | Kreller | |

FOREIGN PATENT DOCUMENTS

| | | |
|---|---|---|
| EP | 0 376 430 A1 | 7/1990 |
| EP | 2 530 219 A1 | 12/2012 |
| FR | 2 723 153 A1 | 2/1996 |
| GB | 2500025 A | 9/2013 |

OTHER PUBLICATIONS

Written Opinion of the International Searching Authority for corresponding International Application No. PCT/EP2016/061417 dated Jul. 22, 2016.
International Preliminary Report on Patentability for corresponding International Application No. PCT/EP2016/061417 dated Jul. 11, 2017.

* cited by examiner

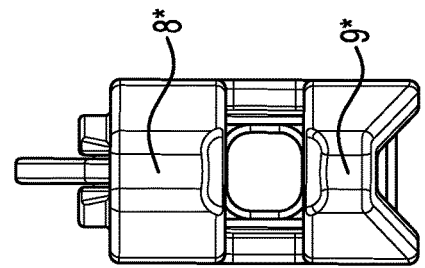
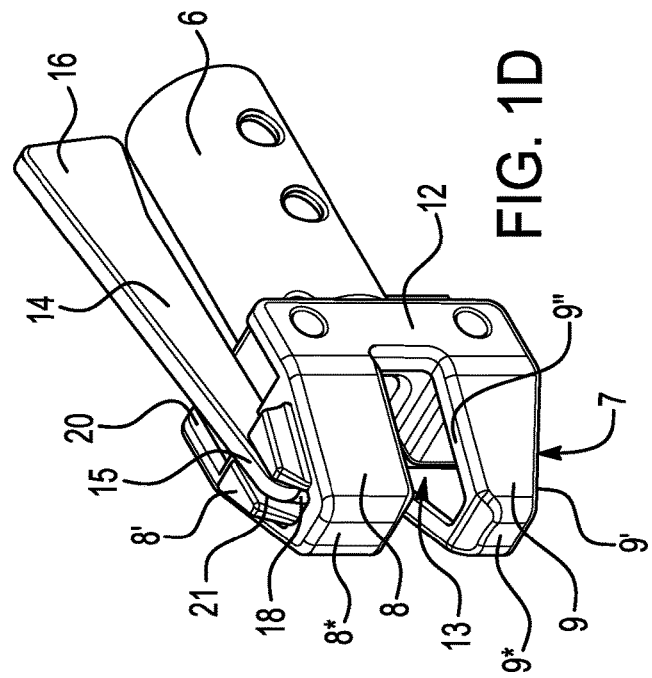
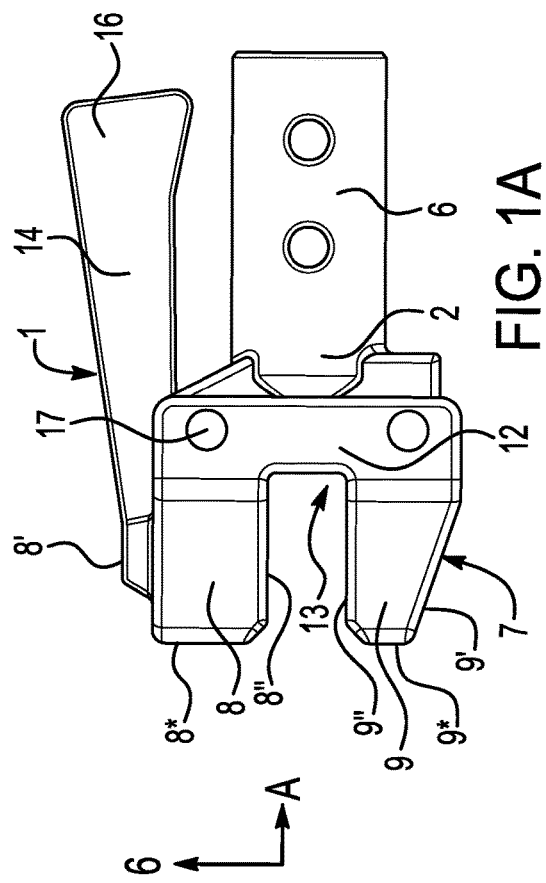
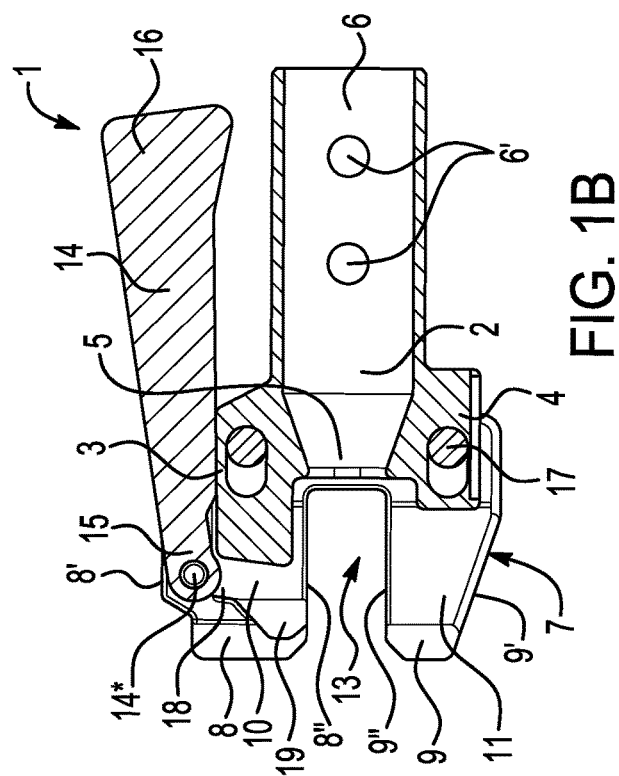

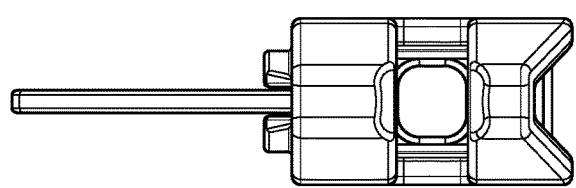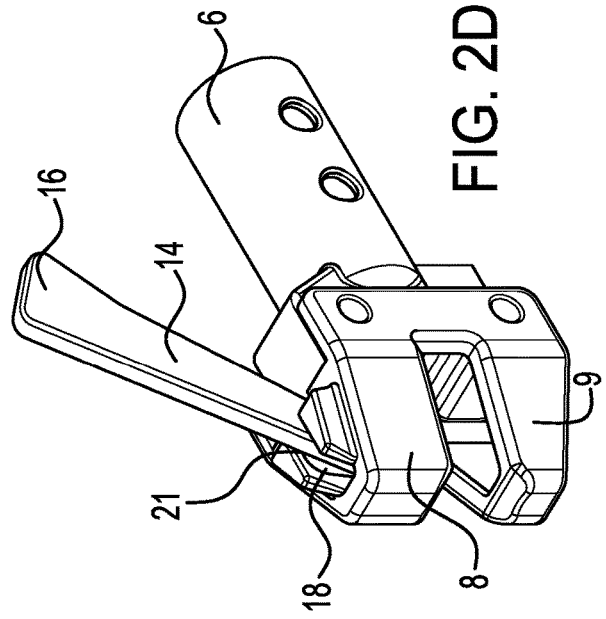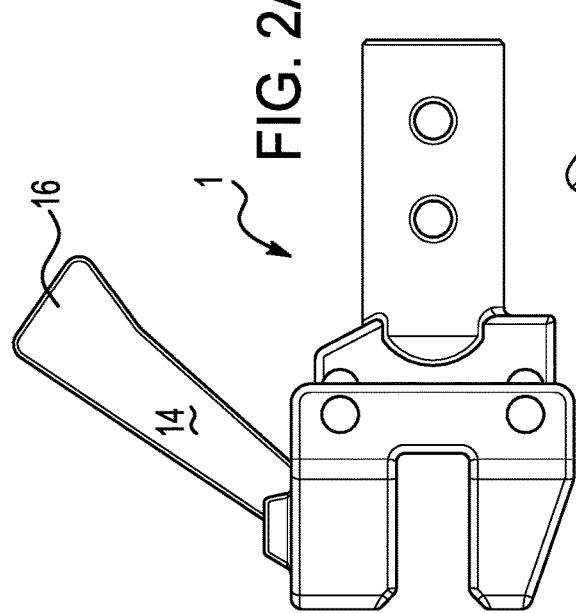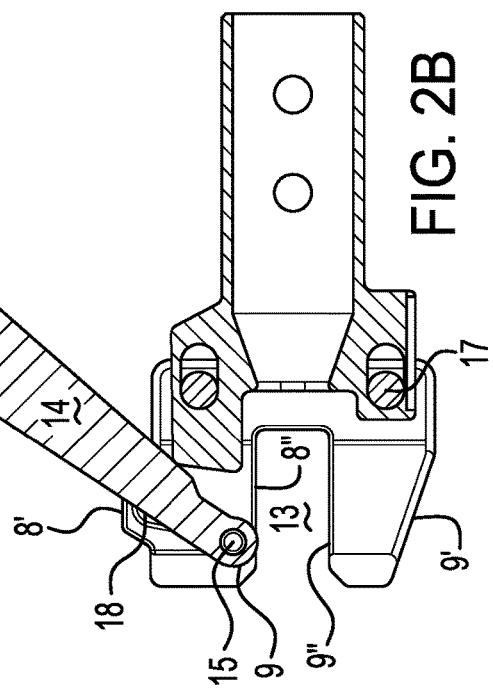

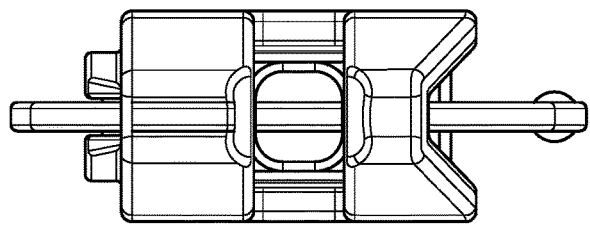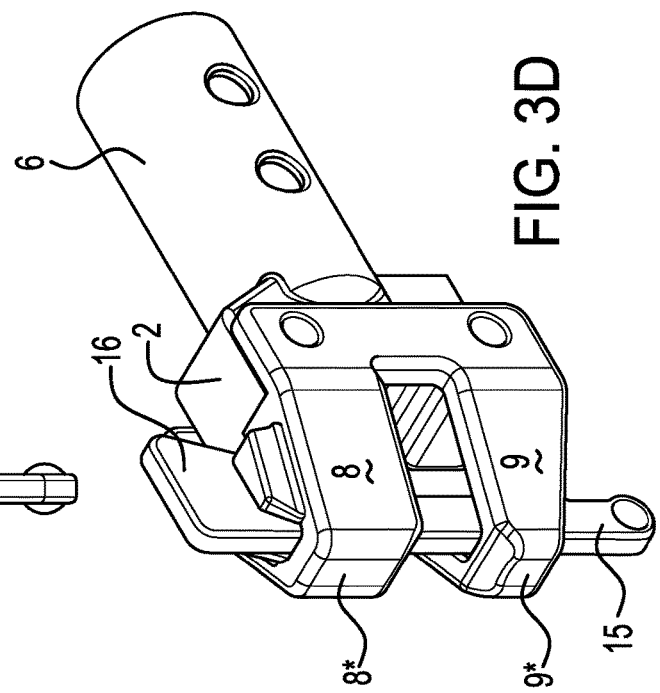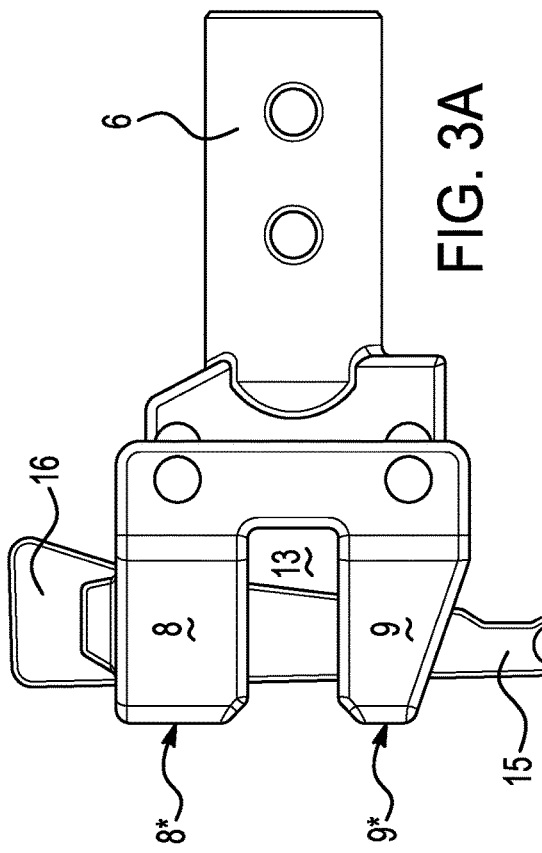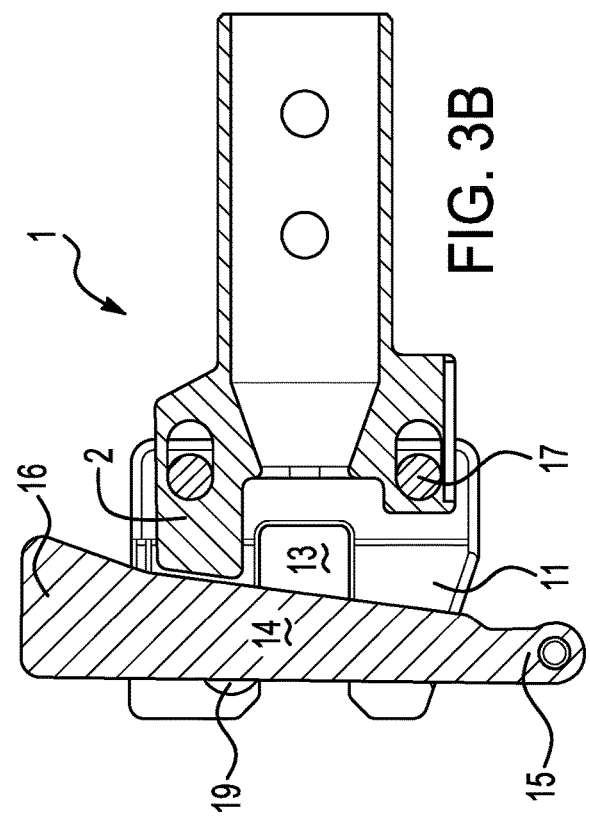

FLEXIBLE FASTENING UNIT FOR A BEAM

This application is a national phase of International Application No. PCT/EP2016/061417 filed May 20, 2016, and claims priority to Swedish Application No. 1550648-8 filed on May 21, 2015, which is incorporated herein by reference.

TECHNICAL FIELD

The present invention relates to a fastening unit for attachment of a first beam to a second beam, wherein the second beam is arranged substantially perpendicularly to the first beam. The present invention also relates to a rail post for a double rail comprising such a fastening unit.

BACKGROUND OF THE INVENTION

Platform units are frequently used in the sector of scaffolding, staircases, podia, stages, or similar support constructions. The platform units are usually equipped with rails in order to prevent the users from falling down by stepping over the edge of the platform, and also for providing additional stability to the platform structure. The simplest form of rail is a horizontal bar extending between each pair of vertical standards. However, the most common type of rail is a double rail, comprising two parallel horizontal beams, and often being provided with one or several diagonal beams running between the parallel beams. Double rails are advantageous since they improve stability of the scaffolding structure compared to the single rail, and provide superior protection for the users moving across the scaffolding structure, which is essential when the scaffolding structures are erected to substantial heights.

In order to enable mounting of double rails to a scaffolding structure, the double rails are supplied in sections, usually having a length corresponding to the length between each pair of vertical standards. Each section of the double rail is delimited by two vertical rail posts. A rail post for a double rail usually comprises an elongated flat bar comprising two connecting elements arranged at the elongated flat bar. The connecting elements are arranged to be attached to a handrail bar, and may comprise at least one aperture for receiving a fastening means.

At the lower portion of the rail post a hook element may be arranged, protruding diagonally downward in a direction opposite to the direction of the connecting elements. The hook element is arranged to be positioned in a locking collar when the rail post is connected to a vertical standard of a scaffolding platform.

At the upper portion of the rail post a fastening unit in the form of a locking head is normally arranged for attaching the upper portion of the rail to the vertical standard. When a rail post with the rail bars connected thereto is being attached to a vertical standard, the hook element is inserted into a first locking collar arranged at the vertical standard, thus positioning the rail post in an inclined relationship to the vertical standard. Then, the rail post is rotated upwards around the inserted end of the rail post until the rail post becomes parallel with the vertical standard, such that the locking head at the upper portion of the rail post is aligned with a second locking collar arranged at the vertical standard. The locking head then slides over the surface of the second locking collar until the rail post is positioned vertically and may be locked in the second locking collar by means of e.g. a wedge protruding through the locking collar and the locking head.

The shortcomings of such a rail post become evident when the orientation of the vertical standard deviates from ideally vertical, which is often the case since the scaffolding structures and similar constructions, usually being assembled under time pressure, are prone to aligning imperfections. Besides, aligning imperfections often accumulate when the scaffolding structures comprise several storeys, and it becomes increasingly more difficult to erect the scaffolding structure without deviating from ideal orientation of the vertical standards. Thus, when the vertical standards are inclined, the locking head will collide with the vertical standard when the rail post is rotated upwards around the inserted end of the rail post, rather than being brought in contact with the locking collar. Then, the process of attaching the double rail to the scaffolding construction has to be interrupted until the orientation of the vertical standard has been corrected, which is cumbersome and time-consuming, and sometimes impossible when the scaffolding structure comprises several storeys, meaning that the vertical standards are virtually locked in their current positions, obtained during mounting of the vertical standards and the flooring. Alternatively, the rail post may be constrained into the correct position by applying excessive force, which is laborious for the user, and which may cause premature wear of the scaffolding elements.

It is therefore an object of the present invention to provide a fastening unit which facilitates assembly of the rails, such that the above-mentioned disadvantages are eliminated. In particular, it is an object of the present invention to provide a fastening unit that is easy to attach to the scaffolding structure even when the scaffolding structure comprises aligning imperfections.

SUMMARY OF THE INVENTION

The present invention described below eliminates disadvantages of the prior art, and provides a fastening unit for attaching a first beam to a second beam, wherein the second beam is arranged substantially perpendicularly to the first beam, wherein the fastening unit facilitates attachment even when the orientation of the beams in relation to each other deviates from ideally perpendicular. In particular, the fastening unit is used for attachment of a horizontal beam to a vertical standard via a locking collar.

According to the present invention, a fastening unit has a first axis and a second axis, wherein the second axis is arranged substantially perpendicularly to the first axis. When the fastening unit is used for attachment of a horizontal beam to a vertical standard via a locking collar, as mentioned above, the first axis of the fastening unit will coincide with the horizontal beam, and will thus be positioned horizontally, while the second axis will be parallel to the vertical standard, and will thus be positioned vertically. However, other spatial orientations of the first and the second axes of the fastening unit are conceivable, depending on the desired orientation of the beams that are connected by means of the fastening unit.

The fastening unit comprises a connecting member extending in a direction parallel to the first axis of the fastening unit and having a first edge portion, a second edge portion and a central portion. The connecting member further comprises a coupling element, wherein the coupling element is arranged to be attached to a first beam. The shape and spatial orientation of the coupling element depends on the geometry of the beam that is to be connected to the coupling element. Thus, the coupling element may have the shape of a cylinder extending along the first axis of the fastening unit, such that a beam in the form of a pipe may be attached to the coupling element. Another possible shape of the coupling element is a rectangular plate. Such a coupling element may be used for attaching a flat beam. The coupling element may comprise at least one aperture for receiving a fastening member, such as a rivet, or a bolt and nut.

The fastening unit further comprises a locking head. The locking head comprises a first leg and a second leg extending substantially parallel to each other in a direction parallel to the first axis of the fastening unit. The first leg and the second leg of the locking head may have the same shape and may be arranged symmetrically on opposite sides of the first axis, such that the first axis constitutes an axis of symmetry of the locking head. Alternatively, the first leg and the second leg may be of different shapes and/or may be arranged asymmetrically in relation to the first axis.

The first leg comprises an outer portion, an inner portion and a first terminal portion, and a first through opening running in a direction parallel to the second axis of the fastening unit between the outer and the inner portions of the first leg. The outer and/or the inner portion of the first leg may be bevelled. When the fastening unit is used for attachment to a locking collar, the bevelled portion(s) of the first leg may facilitate sliding of the fastening unit along the surface of the locking collar until the fastening unit is brought into a correct position. The first through opening may have a cross-section of any suitable shape, wherein the shape of the cross-section may be the same or different throughout the extension of the first through opening.

The second leg comprises an outer portion, an inner portion and a second terminal portion, and a second through opening running in a direction parallel to the second axis of the fastening unit between the outer and the inner portions of the second leg. The outer and/or the inner portion of the second leg may be bevelled. When the fastening unit is used for attachment to a locking collar, the bevelled portion(s) of the second leg may facilitate sliding of the fastening unit along the surface of the locking collar until the fastening unit is brought into correct position. The second through opening may have a cross-section of any suitable shape, wherein the shape of the cross-section may be the same or different throughout the extension of the second through opening.

The extension of the first leg in a direction parallel to the first axis of the fastening unit is preferably equal to the extension of the second leg in the same direction, such that the first terminal portion and the second terminal portion are arranged on a line being substantially parallel with the second axis of the fastening unit. Further, the surface of the first terminal portion and the second terminal portion may be curved when the fastening unit is used for attachment of cylindrical beams, such that the first and the second terminal portions of the locking head may be brought in tight contact with the surface of the cylindrical beam. Such a tight contact between the locking head and the beam provides additional stability to the connection point.

The locking head further comprises a stopping member running in a direction parallel to the second axis of the fastening unit and interconnecting the first and the second legs of the locking head. The stopping member may be of any suitable shape and size. Thus, the stopping member may be rectangular or curved.

The locking head comprises a receiving cavity arranged between the inner portion of the first leg and the inner portion of the second leg and being delimited at an inner end by the stopping member. The receiving cavity is arranged to receive a locking collar. The size and shape of the receiving cavity may vary depending on the dimensions of the locking collar. The distance between the inner portion of the first leg and the inner portion of the second leg may be 0.5-4 cm, preferably 1-3 cm and more preferably 1.5-2.5 cm. The distance between the first terminal portion of the first leg and the inner portion of the receiving cavity may be 2-7 cm, preferably 3-6 cm, more preferably 3.5-5 cm. The distance between the second terminal portion of the second leg and the inner portion of the receiving cavity may be the same or different compared to the distance between the first terminal portion of the first leg and the inner portion of the receiving cavity. The distance between the second terminal portion of the second leg and the inner portion of the receiving cavity may be 2-7 cm, preferably 3-6 cm, more preferably 3.5-5 cm.

The fastening unit further comprises a locking wedge, which is permanently connected to the locking head and is movably arranged inside the first through opening. In order to be movably connected, the dimensions of the locking wedge are slightly smaller than the dimensions of the first through opening, such that the locking wedge may move unhindered inside the first through opening. Permanent connection of the locking wedge to the locking head means that the locking wedge is prevented from being completely removed from the locking head, thus eliminating the risk that the locking wedge is dropped, potentially causing personal injuries, or that the locking wedge is lost. The locking wedge comprises a leading portion arranged at one end of the locking wedge, and a gripping portion at the other end of the locking wedge. The leading portion may be narrower than the gripping portion. The locking wedge may have a tapering shape. The gripping portion is arranged to be gripped by the user during attachment of the fastening unit. Permanent connection of the locking wedge to the locking head may be provided by arranging a restraining element at the leading portion of the locking wedge. Such a restraining element may be a separate element, such as a rivet or a cross-bar, or an integral element, such as a thickened portion of the locking wedge.

According to the present invention, the locking head is movably attached to the connecting member. Thus, the locking head is movable in a direction being parallel to the first axis relative to the connecting member between a first end position and a second end position. The gripping portion of the locking wedge is in contact with the connecting member when the locking head is in the second end position.

The fastening unit according to the present invention has the advantage in that the position of the locking head relative to the connecting member may be adjusted, depending on the alignment imperfection of the second beam, e.g. the vertical standard. Therefore, the fastening unit of the present invention eliminates the risk that the fastening unit collides with the second beam when the first beam is attached to the second beam, which will be described in greater detail below.

The locking head of the fastening unit may be movably attached to the connecting member in a number of ways. For instance, the locking head may be attached to the connecting member such that the first leg is connected to the first edge portion of the connecting member, and the second leg is connected to the second edge portion of the connecting member. It is also conceivable to attach the locking head such that the stopping member is connected to the central portion of the connecting member.

The movable connection between the locking head and the connecting member may be provided by means of a fastening member extending through the locking head and the connecting member. Such a fastening member may be a bolt extending through an opening provided in the locking head and in the connecting member. The opening should be larger than the size of the fastening member, such that the fastening member may move inside the opening. The opening may be elongated, such that the locking head may move relative to the connecting member parallel to the first axis. It is also conceivable that the connecting member comprises an elongated groove, and the locking head comprises a protrusion, which is movably arranged inside the elongated groove, such that the locking head is movable relative to the connecting member parallel to the first axis. Alternatively, the position of the groove and the protrusion may be the opposite, i.e. the elongated groove is arranged on the locking head, and the protrusion is arranged on the connecting member.

The locking wedge may have a start position and an end position. In the start position, the locking wedge is arranged substantially parallel to the first axis of the fastening unit and the leading portion of the locking wedge is retained within the first through opening at the outer portion of the first leg. The leading portion of the locking wedge in the start position may be retained in a first retaining member arranged inside the first through opening at the outer portion of the first leg. The retaining member may be a groove, a cavity, a protrusion, a ledge or combinations thereof. The outer portion of the first leg of the locking head may comprise a receiving groove for accommodating the locking wedge, when the locking wedge is the start position. It is advantageous to arrange the locking wedge parallel to the first axis in the start position of the locking wedge, since the locking wedge would thus not interfere with the second beam when mounting the fastening unit of the present invention.

In the end position, the locking wedge is arranged parallel to the second axis of the fastening unit, such that the leading portion of the locking wedge protrudes through the second through opening, and the gripping portion of the locking wedge is in contact with the connecting member. When the locking wedge is in the end position, the locking head is in the second end position, and the terminal portions of the first and the second legs are in tight contact with the second beam. Since the gripping portion of the locking wedge and the connecting member are in contact with each other, the locking head is pressed towards the second beam, thus creating a tight contact between the locking head and the beam, which in turn provides an extremely stable connection between the first beam and the second beam. The location of the second end position of the locking head may vary dependent on the spatial orientation of the second beam relative to the first beam. Thus, when the orientation of the second beam deviates from perpendicular in relation to the first beam, and the angle between the first and the second beam is less than 90°, the distance between the first end position and the second end position of the locking head will be shorter compared to if the second beam is perpendicular to the first beam. The distance between the first end position and the second end position of the locking head along the first axis may be 2-30 mm, preferably 5-20 mm, more preferably 7-15 mm.

The locking wedge may further have an intermediate position between the start position and the end position. In the intermediate position, the leading portion of the locking wedge is retained within the first through opening at the inner portion of the first leg, and the locking wedge is inclined in relation to the first and second axes of the fastening unit. The leading portion of the locking wedge in the intermediate position may for instance be retained in a second retaining groove arranged inside the first through opening at the inner portion of the first leg. The intermediate position may be considered as an activated position of the locking wedge. When the locking wedge is set into the intermediate position, and the fastening unit is being attached to the second beam, the impact force arising between the second beam and the fastening unit displaces the leading portion of the locking wedge from the intermediate position. Gravity then causes the locking wedge to fall down through the second through opening and to attain the end position, wherein the leading portion of the locking wedge protrudes through the second through opening, and the gripping portion of the locking wedge is in contact with the connecting member. In cases when no impact occurs between the second beam and the fastening unit, the locking wedge may be slightly pushed out of the intermediate position such that the locking wedge falls down and attains the end position as described above. Alternatively, the rail post or the handrail to which the fastening unit is attached may be slightly shaken such that the locking wedge leaves the intermediate position and attains the end position. After the locking wedge has fallen down into the end position under action of gravity, the locking wedge may be secured in the end position if desired e.g. by hammering on the gripping portion of the locking wedge.

When the fastening unit needs to be removed, the locking wedge is displaced from the end position by applying force to the leading portion of the locking wedge in a direction parallel to the second axis b of the fastening unit. The locking wedge is than brought to the start position by pulling the gripping portion until the locking wedge is arranged substantially parallel to the first axis of the fastening unit and the leading portion of the locking wedge is retained within the first through opening at the outer portion of the first leg. The fastening unit may then be removed from the second beam.

The locking head and the connecting member may be arranged relative each other in a number of ways. Thus, the stopping member of the locking head may comprise a guiding channel extending in a direction parallel to the second axis of the fastening unit, and the connecting member may be arranged inside the guiding channel. It is also conceivable that the connecting member comprises a guiding channel extending in a direction parallel to the second axis of the fastening unit, and that the stopping member of the locking head is arranged inside the guiding channel. Further, the locking head and the connecting member may simply overlap.

The present invention provides a rail post for a double rail, wherein the rail post has a longitudinal direction y and a transverse direction x, an upper portion and a lower portion being spaced apart in the longitudinal direction of the rail post. The rail post comprises at least one fastening unit as described above, being arranged at one of the upper and the lower portions of the rail post. The rail post may comprise two fastening units according to the present invention, wherein one of the fastening units is arranged at the upper portion of the rail post, and the other fastening unit is arranged at the lower portion of the rail post. Preferably, the fastening unit is arranged at the upper portion of the rail post. The lower portion of the rail post may comprise a hook element protruding diagonally downward in a direction opposite to the direction of the coupling element of the fastening unit.

When the rail post comprising a fastening unit as disclosed herein is being attached to e.g. a vertical standard, the hook element may be inserted into a first locking collar arranged at the vertical standard, thus positioning the rail post in an inclined relationship to the vertical standard. The locking head is in the first end position, and the locking wedge is in the start position. Then, the rail post is rotated upwards around the inserted end of the rail post until the rail post becomes parallel with the vertical standard, such that the locking head at the upper portion of the rail post is aligned with a second locking collar arranged at the vertical standard. The locking wedge is then brought into the intermediate position. Since the locking head is still in the first end position, there will be enough space between the locking head and the vertical standard even if the orientation of the vertical standard deviates from perpendicular, such that the locking head may slide over the surface of the second locking collar until the rail post is positioned vertically. Finally, the locking wedge is brought into the end position, thus bringing the gripping portion of the locking wedge into contact with the connecting member and forcing the locking head into the second end position such that the terminal portions of the first and the second legs are brought in tight contact with the vertical standard. The tapering shape of the locking wedge causes successively increasing pressure to be exerted on the locking head and the connecting member. Since the locking wedge pushes the locking head towards the vertical standard, the fastening unit has the advantage of being able to correct minor alignment imperfections in the scaffolding structure. The pushing force exerted by the locking wedge on the locking head may be sufficient for straightening the vertical standard and bringing it into perpendicular relationship to the handrail.

Another advantage of the fastening unit is the fact that the fastening unit may be auto-locking. When the distance between the terminal portions of the locking head being in the first end position and the vertical standard is small enough, such that the locking head hits the vertical standard when the fastening unit is mounted, the impact force will be sufficient to release the leading portion of the locking wedge from the second retaining groove, causing the locking wedge to fall down through the second trough opening and to attain the end position, thus bringing the locking head into the second end position such that the terminal portions of the first and second legs of the locking head are in contact with the vertical standard. The step of locking the rail to the scaffolding structure is thus eliminated.

BRIEF DESCRIPTION OF THE DRAWINGS

The present invention will be further explained hereinafter by means of non-limiting examples and with reference to the appended drawings wherein:

FIG. 1A-D shows the fastening unit according to the present invention, wherein the locking head is in the first end position, and the locking wedge is in the start position;

FIG. 2A-D illustrates the fastening unit according to the present invention, wherein the locking wedge is in the intermediate position;

FIG. 3A-D depicts the fastening unit according to the present invention, wherein the locking head is in the second end position, and the locking wedge is in the end position;

DETAILED DESCRIPTION OF PREFERRED EMBODIMENTS

Figure 4:
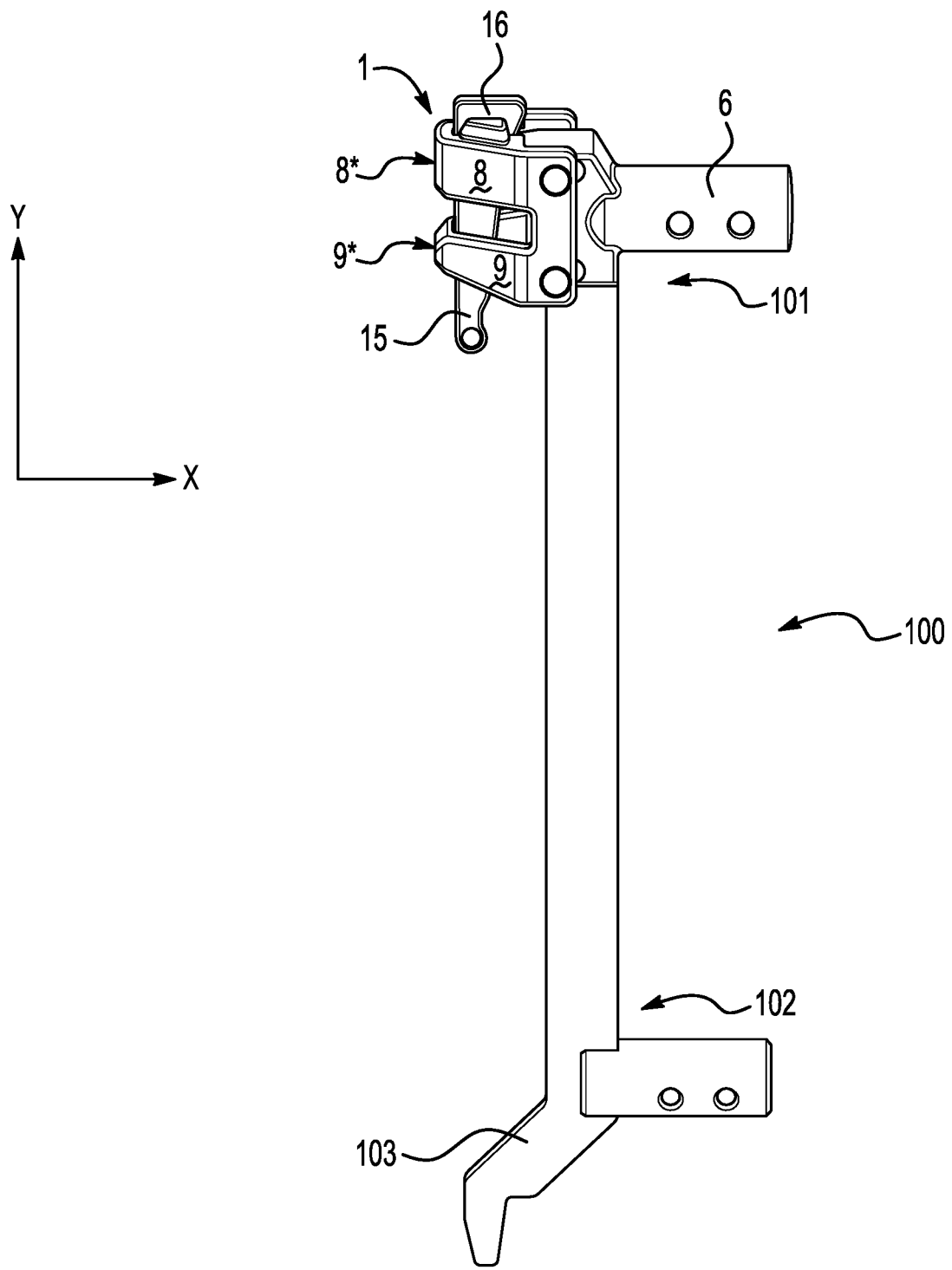
FIG. 4 shows a rail post for a double rail, wherein the rail post comprises a fastening unit according to the present invention.

FIGS. 1A-D depict a fastening unit 1 according to the present invention. The fastening unit 1 has a first axis and a second axis, wherein the second axis is arranged substantially perpendicularly to the first axis. In the embodiment shown in FIGS. 1A-D, the first axis is horizontal axis a, and the second axis is vertical axis b.

The fastening unit 1 comprises a connecting member 2 extending in a direction parallel to the first axis a of the fastening unit 1 and having a first edge portion 3, a second edge portion 4 and a central portion 5. The connecting member 2 further comprises a coupling element 6 in the shape of a cylinder, wherein the coupling element 6 is arranged to be attached to a first beam such as a pipe or a rod. The coupling element 6 comprises two apertures 6' for receiving a fastening member, such as a rivet, or a bolt and nut.

The fastening unit 1 further comprises a locking head 7. The locking head 7 comprises a first leg 8 and a second leg 9 extending substantially parallel to each other in a direction parallel to the first axis of the fastening unit 1. As may be seen in FIGS. 1A-D, the first leg 8 and the second leg 9 of the locking head 7 are of different shapes.

The first leg 8 comprises an outer portion 8', an inner portion 8" and a first terminal portion 8*, and a first through opening 10 running in a direction parallel to the second axis of the fastening unit 1 between the outer and the inner portions 8', 8" of the first leg 8. The inner portion 8" of the first leg 8 is bevelled. When the fastening unit 1 is used for attachment to a locking collar, the bevelled portion of the first leg 8 facilitates sliding of the fastening unit 1 along the surface of the locking collar until the fastening unit 1 is brought into a correct position. The first through opening 10 has a substantially rectangular cross-section at the outer portion 8' of the first leg, and substantially trapezoidal cross-section at the inner portion 8" of the first leg 8.

The second leg 9 comprises an outer portion 9', an inner portion 9" and a second terminal portion 9*, and a second through opening 11 running in a direction parallel to the second axis b of the fastening unit 1 between the outer and the inner portions 9', 9" of the second leg 9. The outer and the inner portions 9', 9" of the second leg 9 are bevelled. The second through opening 11 has a substantially trapezoidal cross-section throughout the entire extension of the second through opening 11.

As seen in FIGS. 1A-D, the extension of the first leg 8 in a direction parallel to the first axis of the fastening unit 1 is equal to the extension of the second leg 9 in the same direction, such that the first terminal portion 8* and the second terminal portion 9* are arranged on a line being substantially parallel with the second axis of the fastening unit 1. The surface of the first terminal portion 8* and the second terminal portion 9* are curved, such that the first and the second terminal portions 8*, 9* of the locking head 7 are in tight contact with the surface of the cylindrical vertical beam, as may be seen in FIG. 6. Such a tight contact between the locking head 7 and the beam provides additional stability to the connection point.

The locking head 7 further comprises a stopping member 12 running in a direction parallel to the second axis of the fastening unit 1 and interconnecting the first and the second legs 8, 9 of the locking head 7. The stopping member 12 depicted in FIGS. 1A-D is substantially rectangular.

Figure 6:
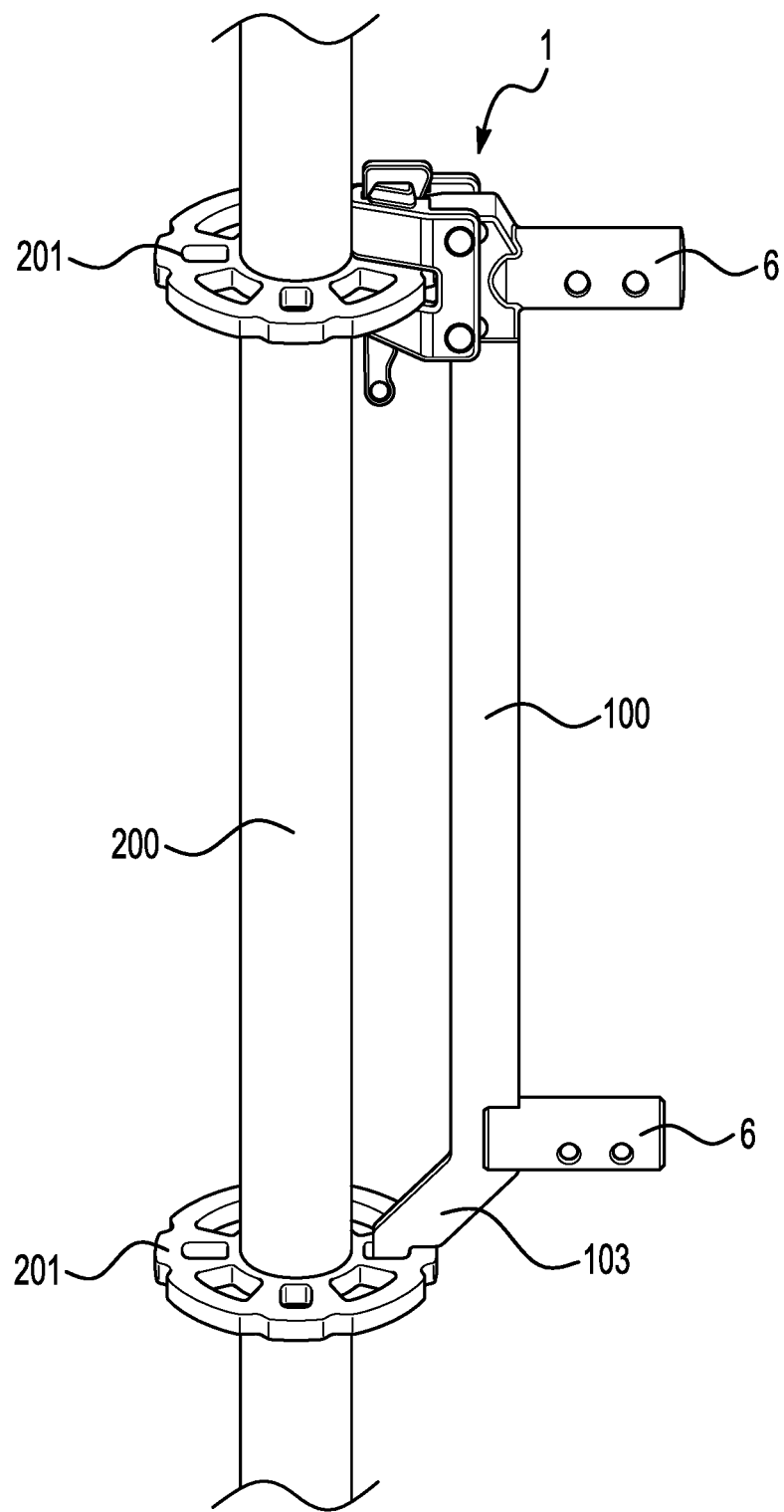
FIGS. 6 and 7 illustrate attachment of the fastening unit according to the present invention to a vertical standard via a locking collar.
Figure 7:
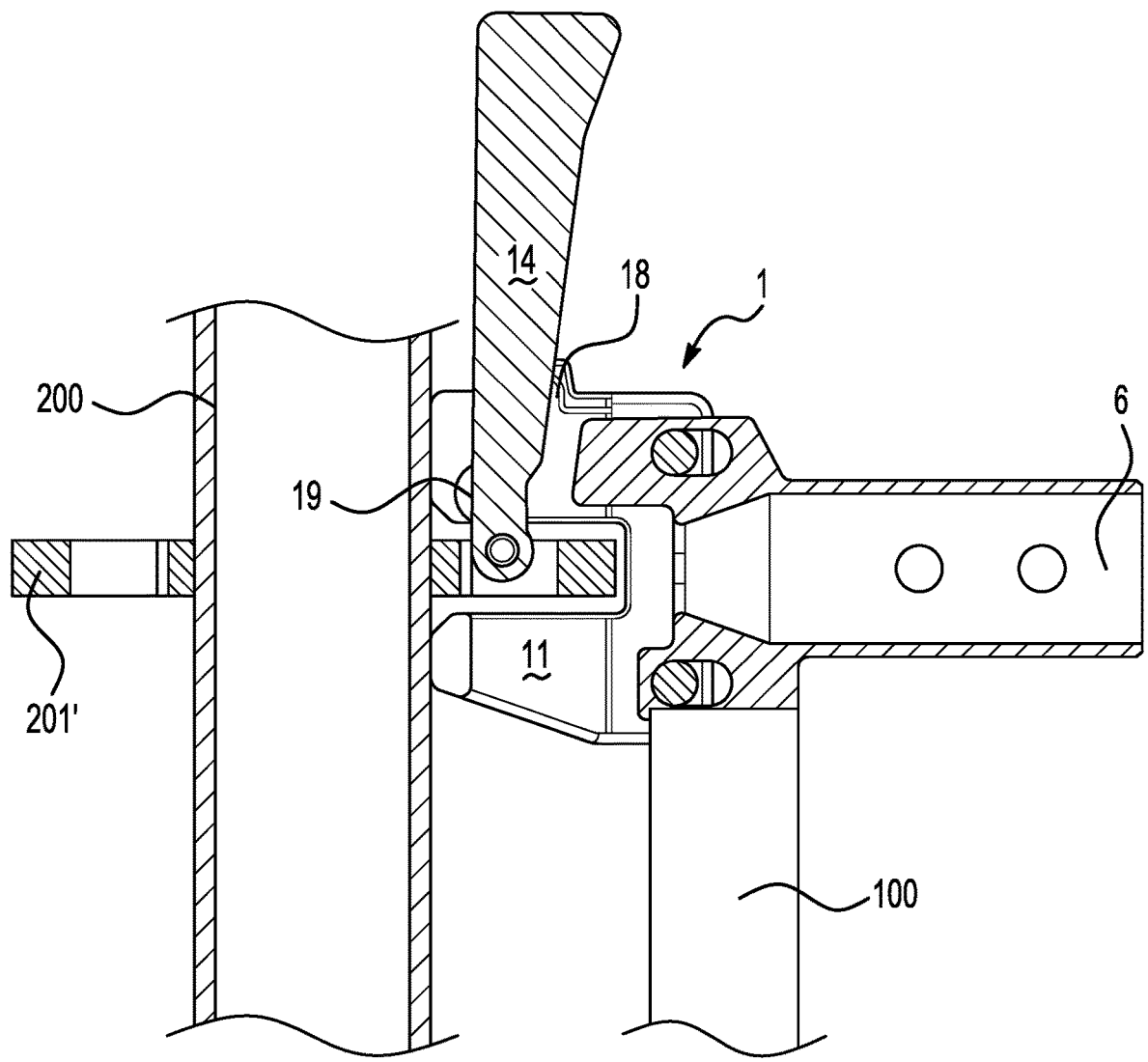

The locking head 7 comprises a receiving cavity 13 arranged between the inner portion 8" of the first leg 8 and the inner portion 9" of the second leg 9. The receiving cavity is delimited at an inner end by the stopping member 12. The receiving cavity is arranged to receive a locking collar, as depicted in FIGS. 6 and 7. As seen in FIGS. 1A-D, the receiving cavity 13 is substantially rectangular. The distance between the inner portion 8" of the first leg 8 and the inner portion 9" of the second leg 9 may e.g. be 2 cm, the distance between the first terminal portion 8* of the first leg 8 and the inner portion of the receiving cavity 13 as well as the distance between the second terminal portion 9* of the second leg 9 and the inner portion of the receiving cavity 13 may e.g. be 4 cm.

The fastening unit 1 depicted in FIGS. 1A-D further comprises a locking wedge 14, which is permanently connected to the locking head 7 and is movably arranged inside the first through opening 10. In order to be movably connected, the locking wedge is shaped to fit in the first through opening 10, such that the locking wedge may move unhindered inside the first through opening 10. The locking wedge comprises a leading portion 15 arranged at one end of the locking wedge 14, and a gripping portion 16 at the other end of the locking wedge 14. The locking wedge has a tapering shape from the gripping portion 16 to the leading portion 15, i.e. the leading portion 15 is narrower than the gripping portion 16. The gripping portion 16 is arranged to be gripped by the user during attachment of the fastening unit 1. Permanent connection of the locking wedge 14 to the locking head 7 is provided by arranging a restraining element 14* at the leading portion 15 of the locking wedge 14. The restraining element 14* is a separate element in the form of a rivet.

According to the present invention, the locking head 7 is movably attached to the connecting member 2. Thus, the locking head 7 is movable in a direction being parallel to the first axis a relative to the connecting member 2 between a first end position and a second end position. The locking head 7 of the fastening unit 1 depicted in FIGS. 1A-D is movably attached to the connecting member 2 such that the first leg 8 is connected to the first edge portion 3 of the connecting member 2, and the second leg 9 is connected to the second edge portion 4 of the connecting member 2. The movable connection between the locking head 7 and the connecting member 2 is provided by means of a fastening member 17 extending through an opening provided in the locking head 7 and the connecting member 2. The opening is elongated, such that the locking head 7 may move relative to the connecting member 2 parallel to the first axis a.

The stopping member 12 of the locking head 7 depicted in FIGS. 1-3 comprises a guiding channel 20 extending in the second axis of the fastening unit 1, and the connecting member 2 is arranged inside the guiding channel 20.

FIGS. 1A-D illustrates the fastening unit 1 of the present invention, wherein the locking wedge 14 is in the start position, and the locking head is in the first end position. In the start position, the locking wedge 14 is arranged substantially parallel to the first axis a of the fastening unit 1 and the leading portion 15 of the locking wedge 14 is retained within the first through opening 10 at the outer portion 8' of the first leg 8. The leading portion 15 of the locking wedge 14 in the start position is retained in a first retaining groove 18 arranged inside the first through opening 10 at the outer portion 8' of the first leg 8. The outer portion 8' of the first leg 8 of the locking head 7 comprises a receiving groove 21 for accommodating the locking wedge 14, when the locking wedge 14 is in the start position. As mentioned above, it is advantageous to arrange the locking wedge 14 parallel to the first axis a in the start position of the locking wedge 14, since the locking wedge 14 would thus not interfere with the second beam when mounting the fastening unit 1 of the present invention.

FIGS. 2A-D depict the locking wedge 14 in the intermediate position between the start position and the end position. In the intermediate position, the leading portion 15 of the locking wedge 14 is retained within the first through opening 10 at the inner portion 8" of the first leg 8, and the locking wedge 14 is inclined in relation to the first and second axes a, b of the fastening unit 1. The leading portion 15 of the locking wedge 14 in the intermediate position is retained in a second retaining groove 19 arranged inside the first through opening 10 at the inner portion 8" of the first leg 8.

As mentioned above, such an intermediate position of the locking wedge 14 provides the fastening unit having an auto-locking function. When the distance between the terminal portions 8*, 9* of the locking head 7 being in the first end position and the vertical standard is small enough, such that the locking head 7 hits the vertical standard when the fastening unit 1 is mounted, the impact force will be sufficient to release the leading portion 15 of the locking wedge 14 from the second retaining groove 19, causing the locking wedge 14 to fall down under action of gravity through the second through opening and to attain the end position, thus bringing the locking head 7 into the second end position such that the terminal portions 8*, 9* of the first and second legs 8, 9 of the locking head 7 are in contact with the vertical standard, and eliminating the step of locking the rail to the scaffolding structure.

FIGS. 3A-D illustrates the fastening unit 1 of the present invention, wherein the locking wedge 14 is in the end position, and the locking head 7 is in the second end position. In the end position, the locking wedge 14 is arranged parallel to the second axis b of the fastening unit 1, such that the leading portion 15 of the locking wedge 14 protrudes through the second through opening 11, and the gripping portion 16 of the locking wedge 14 is in contact with the connecting member 2. When the locking wedge 14 is in the end position, the locking head 7 is brought into the second end position by a pushing force from the contact point between the gripping portion 16 of the locking wedge 14 and the connecting member 2. The tapering shape of the locking wedge 14 causes successively increasing pressure to be exerted on the locking head 7 and the connecting member 2 when the locking wedge 14 attains the end position by falling through the second through opening 11 and/or by being pushed to the end position by applying force to the gripping portion 16 of the locking wedge 14 in a direction being parallel to the second axis b. The terminal portions 8*, 9* of the first and the second legs 8, 9 are thus brought into tight contact with the second beam. Since the gripping portion of the locking wedge 14 and the connecting member 2 are in contact with each other, the locking head 7 is pressed towards the second beam, as shown in FIGS. 6 and 7, thus creating a tight contact between the locking head 7 and the second beam, which in turn provides an extremely stable connection between the first beam and the second beam. As mentioned above, the location of the second end position of the locking head 7 may vary dependent on the spatial orientation of the second beam relative to the first beam. Thus, when the orientation of the second beam deviates from perpendicular in relation to the first beam, and the angle between the first beam and the second beam is less than 90°, the distance between the first end position and the second end position of the locking head 7 will be shorter compared to if the second beam is perpendicular to the first beam. The distance between the first end position and the second end position of the locking head 7 along the first axis may be 2-30 mm, preferably 5-20 mm, more preferably 7-15 mm.

FIG. 4 shows a rail post 100 for a double rail, wherein the rail post has a longitudinal direction y and a transverse direction x, an upper portion 101 and a lower portion 102 being spaced apart in the longitudinal direction y of the rail post 100. The rail post 100 comprises a fastening unit 1 as described above, being arranged at the upper portion 101 of the rail post 100. The lower portion 102 of the rail post 100 comprises a hook element 103 protruding diagonally downward in a direction opposite to the direction of the coupling element 6 of the fastening unit 1.

Figure 5:
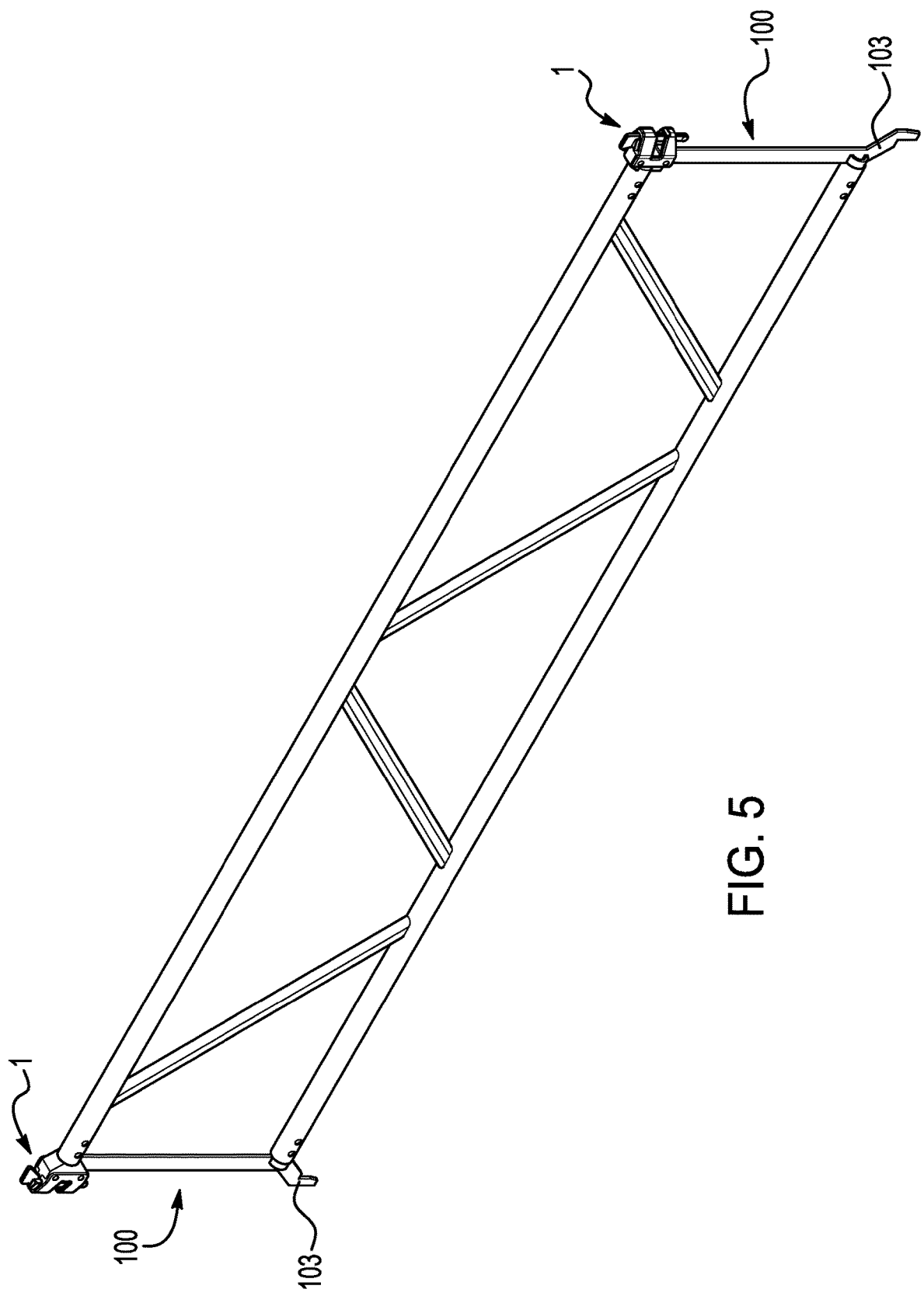
FIG. 5 depicts a double rail comprising two rail posts each comprising a fastening unit according to the present invention.

FIG. 5 illustrates a double rail comprising two rail posts 100 according to the present invention.

When the rail post 100 comprising a fastening unit 1 of the present invention is being attached to e.g. a vertical standard 200, as shown in FIG. 6, the hook element 103 is inserted into a first locking collar 201 arranged at the vertical standard 200, thus positioning the rail post 100 in an inclined relationship to the vertical standard 200. The locking head 7 is then in the first end position, and the locking wedge 14 is in the start position, as shown in FIGS. 1A-D. Then, the rail post 100 is rotated upwards around the inserted end of the rail post 100 until the rail post 100 becomes parallel with the vertical standard 200, such that the locking head 7 at the upper portion 101 of the rail post 100 is aligned with a second locking collar 201' arranged at the vertical standard 200, as shown in FIG. 7. The locking wedge 14 is then brought into the intermediate position, shown in FIGS. 2A-D. Since the locking head 7 is still in the first end position, there will be enough space between the locking head 7 and the vertical standard 200, even if the orientation of the second beam relative to the first beam deviates from perpendicular, such that the locking head 7 may slide over the surface of the second locking collar 201' until the rail post 100 is positioned vertically. Finally, the locking wedge 14 is brought into the end position, thus bringing the gripping portion 16 of the locking wedge 14 into contact with the connecting member 2 and forcing the locking head 7 into the second end position such that the terminal portions 8\*, 9\* of the first and the second legs 8, 9 are brought in tight contact with the vertical standard 200, as shown in FIG. 6, thus locking the rail to the rest of the scaffolding structure. Since the locking wedge 14 pushes the locking head 7 towards the vertical standard 200, the fastening unit 1 has the advantage of being able to correct minor alignment imperfections in the scaffolding structure. The force exerted by the locking wedge 14 on the locking head 7 may be sufficient for straightening the vertical standard and bringing it into perpendicular relationship to the handrail.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention.

The invention claimed is:

1. A fastening unit for attaching a horizontal first beam to a second beam, said second beam being a vertical standard, via a locking collar, wherein said second beam is arranged substantially perpendicularly to said first beam, said fastening unit having a first axis and a second axis, wherein said second axis is substantially perpendicular to said first axis, said fastening unit comprising:

a connecting member extending in a direction parallel to said first axis of said fastening unit and having a first edge portion, a second edge portion and a central portion, said connecting member further comprising a coupling element, wherein said coupling element is arranged to be attached to said first beam;

said fastening unit further comprising a locking head, said locking head comprising a first leg and a second leg extending substantially parallel to each other in a direction parallel to said first axis of said fastening unit, said first leg comprising an outer portion and an inner portion, and a first through opening running in a direction parallel to said second axis of said fastening unit between said outer and said inner portions of said first leg, said second leg comprising an outer portion and an inner portion, and a second through opening running in a direction parallel to said second axis of said fastening unit between said outer and said inner portions of said second leg, said locking head further comprising a stopping member running in a direction parallel to said second axis of said fastening unit and interconnecting said first and said second legs of said locking head, said locking head comprising a receiving cavity arranged between said inner portion of said first leg and said inner portion of said second leg and being delimited at an inner end by said stopping member, said receiving cavity being arranged to receive said locking collar;

said fastening unit further comprising a locking wedge, which is permanently connected to said locking head and is movably arranged inside said first through opening, said locking wedge comprising a leading portion arranged at one end of said locking wedge, and a gripping portion at the other end of said locking wedge;

wherein said locking head is movably attached to said connecting member, in that said locking head is movable in a direction substantially parallel to said first axis relative said connecting member between a first end position and a second end position, and in that said gripping portion of said locking wedge is in contact with said connecting member when said locking head is in said second end position, wherein the movable connection between the locking head and the connecting member is provided by means of a fastening member extending through said connecting member and said locking head.

2. The fastening unit according to claim 1, wherein said locking head is movably attached to said connecting member such that said first leg is connected to said first edge portion of said connecting member, and said second leg is connected to said second edge portion of said connecting member.

3. The fastening unit according to claim 1, wherein said locking wedge has a start position and an end position, wherein in said start position said locking wedge is arranged parallel to said first axis of said fastening unit and said leading portion of said locking wedge is retained within said first through opening at said outer portion of said first leg, and in said end position said locking wedge is arranged parallel to said second axis of said fastening unit, such that said leading portion of said locking wedge protrudes through said second through opening, and said gripping portion of said locking wedge is in contact with said connecting member.

4. The fastening unit according to claim 3, wherein said leading portion of said locking wedge in said start position is retained in a first retaining groove arranged inside said first through opening at said outer portion of said first leg.

5. The fastening unit according to claim 3, wherein said locking wedge further comprises an intermediate position between said start position and said end position, wherein in said intermediate position said leading portion of said locking wedge is retained within said first through opening at said inner portion of said first leg, and said locking wedge is inclined in relation to said first and second axes of said fastening unit.

6. The fastening unit according to claim 5, wherein said leading portion of said locking wedge in said intermediate position is retained in a second retaining groove arranged inside said first through opening at said inner portion of said first leg.

7. The fastening unit according to claim 1, wherein said stopping member comprises a guiding channel extending in a direction parallel to said second axis of said fastening unit, and wherein said connecting member is arranged inside said guiding channel.

8. The fastening unit according to claim 1, wherein said outer portion of said first leg of said locking head comprises a receiving groove for accommodating said locking wedge, when said locking wedge is said start position.

9. The fastening unit according to claim 1, wherein the distance between said first end position and said second end position of said locking head along said first axis is 2-30 mm.

10. A rail post for a double rail, said rail post having a longitudinal direction (y) and a transverse direction (x), said rail post further having an upper portion and a lower portion, said upper and lower portions being spaced apart in said longitudinal direction (y) of said rail post, wherein said rail post comprises at least one fastening unit according to claim 1 arranged at one of said upper and said lower portions of said rail post.

11. The rail post according to claim 10, wherein the rail post comprises one fastening unit and wherein said fastening unit is arranged at said upper portion of said rail post.

12. The rail post according to claim 11, wherein a hook element is arranged at said lower portion of said rail post, said hook element protruding diagonally downward in a direction opposite to the direction of said coupling element of said fastening unit.

* * * * *